Sept. 25, 1945.    C. W. LEGUILLON    2,385,453
SELF-LAYING TRACK
Filed Aug. 8, 1942
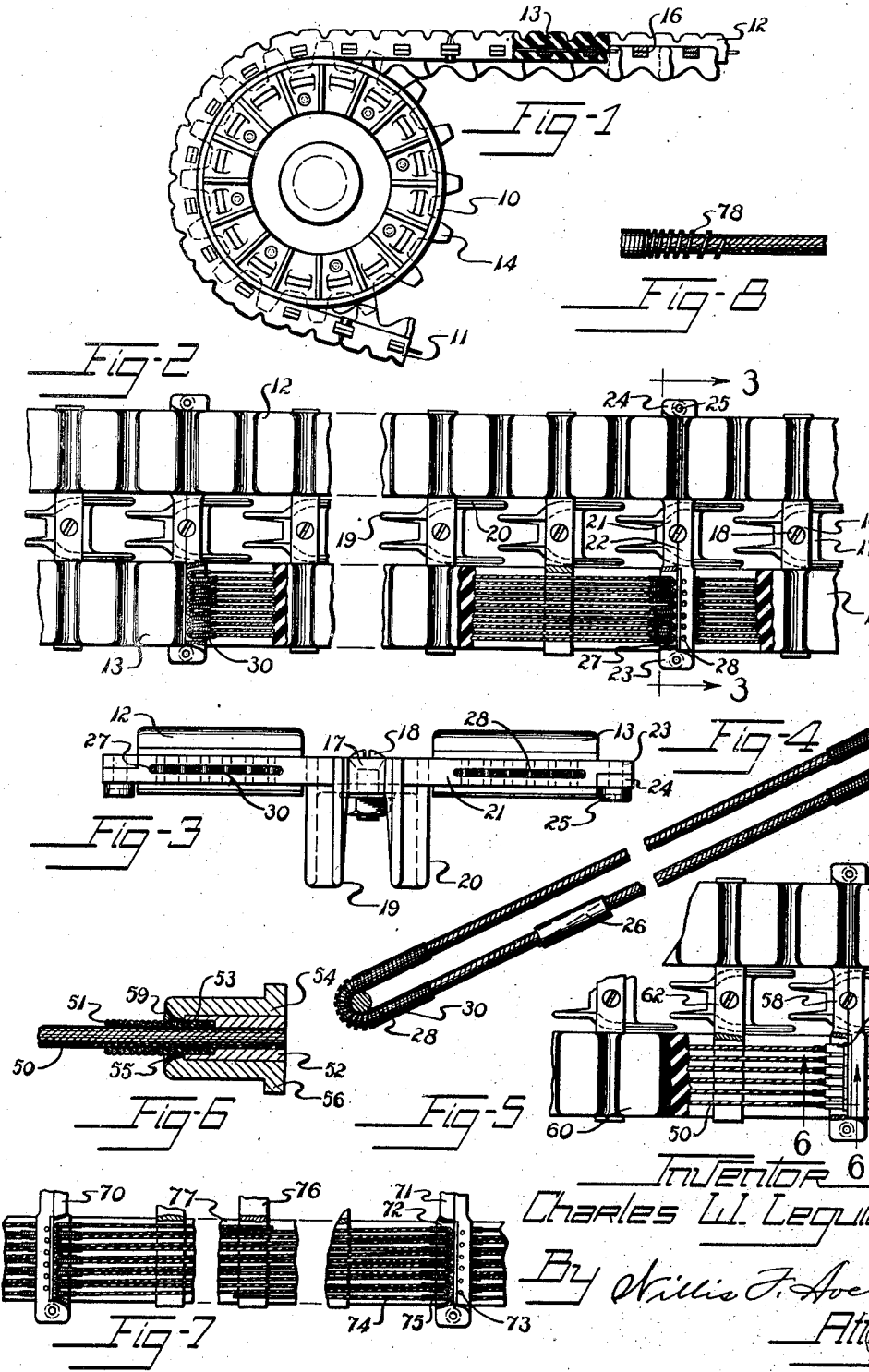
Inventor
Charles W. Leguillon
By Willis F. Avery
Atty Patented Sept. 25, 1945

2,385,453

UNITED STATES PATENT OFFICE 2,385,453

SELF-LAYING TRACK

Charles W. Leguillon, Akron, Ohio, assignor to
The B. F. Goodrich Company, New York, N. Y.,
a corporation of New York Application August 8, 1942, Serial No. 454,145

19 Claims. (Cl. 305—10)

This invention relates to self-laying track for vehicles and is especially useful in the construction of flexible self-laying track for tractors, military tanks, and agricultural and excavating vehicles having strands of flexible metal cable embedded in rubber for sustaining the tension load, with anchor driving bars, grousers, couplings, and other substantially rigid parts of the track anchored to such cables.

In prior attempts to make the track open-ended or in detachable sections satisfactory anchorage has been a problem, especially where it has been attempted to anchor the cables by rigidly clamping them in place, difficulties having been experienced due to premature breaking of the cable strands by concentrated and sudden stresses in tension and flexing stresses developed in the cables particularly in their regions in or near the position of attachment. It has appeared that the severe forces causing this failure have had the character of shock in their effect, as when the track has bumped obstructions or the driving teeth have engaged the crossbars suddenly, setting up waves of tension stress in the cables resulting in concentrated shock stresses in or near the zones of anchorage of the cables.

The present invention aims to overcome the foregoing and other difficulties and to provide an improved flexible track structure, especially of an open-ended or sectional construction.

The principal objects of the invention are to avoid concentrated stresses, to damp out or avoid concentrated shock stresses, to avoid premature breakage of the cable elements, to provide longevity of structure, and to eliminate sharp bending of the cable. Further objects are to provide effectively for anchorage of the tension elements such that the track may be made separable or sectional, and to provide for convenience of attachment and detachment.

These and other objects will appear from the following description and the accompanying drawing.

Of the drawing,

Fig. 1 is a side elevation of a driving wheel and a portion of a flexible track thereabout constructed in accordance with and embodying the invention, parts of the track being broken away.

Fig. 2 is a tread face view of the track of Fig. 1, parts being broken away to show its construction.

Fig. 3 is a sectional view thereof, taken on line 3—3 of Fig. 2.

Fig. 4 is a detail view of one of the endless tension elements.

Fig. 5 is a plan view of a portion of a track, showing a modified form of the invention, parts being broken away to show the construction.

Fig. 6 is a sectional view of an end of one of the cable tension elements, taken on line 6—6 of Fig. 5.

Fig. 7 is a face view of a portion of a track, showing a further modification of the invention, parts being broken away.

Fig. 8 is a detail view of a cable and its flexible sleeve, parts being broken away.

Referring to the drawing, and first to the embodiment illustrated in Figs. 1 to 4, the numeral 10 designates a driving wheel of a vehicle of the self-laying track type, and the numeral 11 a flexible track extending thereabout. The track illustrated has a center-drive and comprises flexible driving bands 12, 13 of vulcanized rubber-like material spaced-apart laterally to clear the driving teeth 14 of the driving wheels. Stiff crossbars 16 of metal extend cross-wise of the track at regular intervals and have removable wear plates 17 secured thereto by bolts 18. These wear plates engage the teeth 14 of the sprocket and may be provided, as shown, with overlapping guide flanges 19, 20 for preventing side sway of the track.

To facilitate removal and overhaul of the track, the track is preferably made open-ended or made in sections having at their ends coupling bars 21, 22 which take the place of the cross-bars 16 at these positions when coupled to each other. For coupling the coupling bars to each other, these are provided at their ends with overlapping ears 23, 24 through which bolts 25 extend. The bolts 18 also assist in holding the coupling bars in coupled relation.

For sustaining the load under tension, tension members extend through these flexible bands 12, 13 from one coupling bar to another and are secured to the coupling bars and the cross-bars. As shown in Fig. 4, each tension member is in the form of an endless link of cable spliced at 26 as by securing the ends of the cable within a sleeve, preferably by swaging or contraction of the sleeve. This splice is preferably located intermediate successive cross-bars so as to be free to adjust itself in the rubber-like material. For securing the loops of the link to the coupling bars 21, 22, the bars are each formed with a mortice 27 through the coupling bar in the direction of the tension members, pins 28 extend across the mortice at spaced-apart intervals with their ends fixed to the coupling bars, and the loops of the tension members encompass the pins at each tension bar.

To prevent breaking of the tension members due to concentrated stresses, especially due to periodic and shock tensioning and flexing of the track and also due to flexing of the cables at the coupling bars, a flexible sleeve 30, preferably a closely wound sleeve of metal such as spring wire, is slipped over the cable of the tension member along the looped portion with its ends extending away from the coupling bar along the cable reaches for a substantial distance. The sleeve protects the cable from contact with the pin and the coupling bar, and stiffly but elastically supports it for a distance away from the coupling bar. The ends of the sleeves 30 may be extended different distances from the coupling bar, or staggered, so as not to terminate at a single plane of cross-section of the track. Due to the elasticity and extensibility of the flexible sleeve both longitudinal movements and bending of the sleeve are possible and friction between the sleeve and the cable is minimized while at the same time periodic tension peaks due to shock stressing of the track when the cross-bars strike the sprockets and the ground, and to vibration of the track, are cushioned or damped out, while the cable is firmly supported against sharp bending adjacent the coupling bar.

To assist further in damping out vibrational stresses of the cables and to provide increased flexibility of the flexible sleeves at their outer ends, these ends of the sleeves may be wound with increasing pitch or stretched somewhat after winding as illustrated at 78 in the modification of Fig. 8, thereby feathering out their support of the cables.

The cables and the flexible sleeves are preferably completely embedded in the rubber-like material of the flexible bands 12, 13 and the rubber-like material extends about them within the mortice and is bonded to the metal cables, the sleeves, and the connecting and cross-bars preferably by a bond resulting from vulcanization of the rubber-like material in contact with the metal. The rubber-like material may also be forced in between the convolutions of the sleeve 30 and the cables to insulate them and resist abrasive wear.

The tension members may be of any desired length and the track may be made up of one or more track sections joined together by the coupling bars at their ends. When a plurality of sections are employed, a damaged section may be removed and replaced without discarding the entire track.

In the form of the invention shown in Figs. 5 and 6, the tension members 50 are open-ended lengths of metallic cable. Each end of each cable member has a flexible tubular sleeve member 51 thereabout similar to the flexible sleeves previously described, and a ferrule 52 of metal having a counterbore 53 to receive one end of the flexible sleeve member 51 is swaged or contracted about the end of the cable. The ferrule 52 is then secured in a bushing 54 having an inwardly directed flange 55 forming a shoulder for securing it against tension. An outwardly directed shoulder 56 is formed on the opposite end of the bushing for holding it against tension in a socket 57 of a coupling bar 58. The coupling bar is formed with a plurality of such sockets for securing a plurality of tension members in spaced-apart relation with their axes preferably in a single plane. The bushings 54 are formed with a bellmouth 59 adjacent the flange 55 so as to permit limited bending of the cable 50 and sleeve 51, and the sleeve 51 extends well beyond the bushing so as to support the cable flexibly and resiliently against sharp bending.

The flexible sleeves may be of increasing pitch or stretched somewhat at their outboard ends and the ends of the sleeves may be staggered in their extent from the coupling bar so that they do not all end in one plane of cross-section of the track.

The tension members 50 are embedded in flexible bands 60, 61 of vulcanized rubber-like material which also enclose portions of the connecting bars 58 and cross-bars 62 as in the construction of Fig. 2.

In the form of the invention shown in Fig. 7, coupling bars 70, 71 are each formed with mortices such as 72 crossed by a row of pins 73. A single metallic cable 74 is looped back and forth alternately about the pins of coupling bars 70 and 71 to provide a plurality of reaches of cable each formed with loops about the pins. Flexible sleeves 75, which may be of close-wound spring wire, encompass the cable where it extends about each pin to protect it from wear and extend along the cable beyond the connecting bar to protect the cable against localized stress and sharp bending, the extent of the ends of the sleeves being for different distances to reduce opportunity for undue localized stress to result. Cross-bars 76 are secured to the reaches of cables at spaced-apart intervals along the track between the coupling bars, as by intervening rubber-like material bonded to the parts, and flexible bands 77 of vulcanized rubber-like material enclose the cable and portions of the cross-bars and coupling bars. The free ends of the sleeves may be of increased pitch or spaced coils to feather off their support of the cables as in the structures previously described.

In the several forms of the invention the flexible metallic sleeves extend a substantial distance away from the stiff coupling bars along reaches of the metallic cable to eliminate or reduce stress peaks caused by periodic and shock stressing and flexing of the cables and also to limit localized bending of the cable abruptly, and the free ends of the flexible sleeves are preferably of open coils and stepped in extent. The sleeves are also embedded within vulcanized rubber-like material. The rubber-like material may extend as a film between the cable and the flexible sleeve and its elasticity permits relative movement of the metallic parts while preventing them from abrading each other, and the rubber-like material is preferably bonded to all the metal parts.

Variations may be made without departing from the spirit of the invention as it is defined by the following claims.

I claim:

1. In a flexible self-laying vehicle track having anchoring members and flexible metallic cables extending therebetween and anchored thereto, the combination of a flexible sleeve closely surrounding a cable at an anchoring position and extending from within the anchoring member along the cable with the end of the sleeve disposed beyond the member.

2. In a flexible self-laying vehicle track having anchoring members and flexible metallic cables extending therebetween and anchored thereto, the combination of a flexible sleeve surrounding a cable at an anchoring position and extending along the cable with the end of the sleeve disposed beyond the member, and flexible vulcanized rubber-like material surrounding at least a portion of said cable and said sleeve and extending therebetween.

3. A flexible self-laying vehicle track comprising anchoring members, flexible metallic cable links having looped connections with said members, and a flexible sleeve closely surrounding each cable at its looped portion with its ends extending in the same direction along the reaches of the link beyond the member.

4. A flexible self-laying vehicle track comprising anchoring members, flexible metallic cable links having looped connections with said members, a flexible sleeve surrounding each cable at its looped portion with its ends extending along the reaches of the cable beyond the member, and flexible vulcanized rubber-like material surrounding a portion of said cable and said sleeve and extending therebetween.

5. A flexible self-laying vehicle track comprising a plurality of cross-members, flexible cables extending from one cross-member to another, and a flexible sleeve closely surrounding a portion of a cable at a cross-member, said sleeve comprising a tube of close-wound spring wire.

6. A flexible self-laying vehicle track comprising a plurality of cross-members, flexible cables extending from one cross-member to another, and a flexible sleeve surrounding a portion of a cable at a cross-member, said sleeve comprising a tube of spring wire wound helically in close coils throughout a part of its extent and of open coils therebeyond at the end of the sleeve remote from the cross-member.

7. A flexible self-laying vehicle track comprising parallel reaches of cable in spaced-apart relation, a cross-member secured to said reaches, flexible metallic sleeves surrounding individual cable reaches at said member, and a body of rubber surrounding said cable reaches and said sleeves, said sleeves extending different distances from said member along different reaches of cable.

8. A flexible self-laying vehicle track comprising a plurality of cross-members, flexible reaches of cable extending from one cross-member to another, a tubular flexible sleeve surrounding a portion of a cable reach at a cross-member, and a body of rubber enclosing the cable reach, the sleeve, and at least a portion of the cross-member, and extending between the sleeve and the cable.

9. A flexible self-laying vehicle track comprising a plurality of cross-members, a flexible cable extending between said cross-members and looped thereabout with its direction completely reversed, and a flexible tubular sleeve surrounding a looped portion of said cable at one of said cross-members.

10. A flexible self-laying vehicle track comprising a plurality of cross-members, a link of flexible cable extending between cross-members and having loops engaging the cross-members, and a looped flexible metal sleeve surrounding the cable at each loop of the cable.

11. A flexible self-laying vehicle track comprising a looped flexible tension member extending lengthwise of said track, a member engaging a loop of said tension member, and a flexible sleeve surrounding said tension member between the tension member and the member engaging it at the looped portion.

12. A flexible self-laying vehicle track comprising a flexible tension member extending length-wise of said track, a member engaging a portion of said tension member, and a flexible wire sleeve closely surrounding a portion of said tension member at the position of engagement.

13. A flexible self-laying vehicle track comprising a flexible tension member extending lengthwise of said track, a member engaging a portion of said tension member, and a flexible sleeve surrounding a portion of said tension member at the position of engagement, the ends of said sleeve extending different distances from the first said member.

14. In a flexible self-laying vehicle track having reaches of cable in spaced-apart relation, and a member secured to a plurality of said reaches, means for protecting said cable reaches comprising a flexible wire sleeve adapted to be secured at said member and to extend along the cable reaches from said member.

15. In a flexible self-laying vehicle track having reaches of cable in spaced-apart relation, and a stiff metallic member secured to a plurality of said reaches, means for protecting said cable reaches comprising a flexible metallic sleeve closely encompassing a cable reach and secured at said metallic member and to extend along the cable reach to a position beyond said member, said sleeve being of close-wound spring wire.

16. In a flexible self-laying vehicle track having reaches of cable in spaced-apart relation, and a stiff metallic member secured to a plurality of said reaches, means for protecting said cable reaches comprising a flexible metallic sleeve adapted to be secured at said metallic member and to extend along a cable reach beyond said member, said sleeve being of helically-wound spring wire of close coils at its position of attachment and open coils at its free end.

17. A flexible self-laying vehicle track comprising a flexible tension member extending lengthwise of said track, a stiff metallic member engaging a portion of said tension member, and a flexible tubular sleeve surrounding a portion of said tension member at the position of engagement, said tension member comprising a metal cable and said sleeve comprising wire closely coiled about said cable at said stiff metallic member and terminating beyond the latter.

18. A flexible self-laying vehicle track comprising a plurality of track sections, coupling members at the ends of a section, a flexible tension member extending through said section from one coupling member to another and secured thereto, and a flexible tubular sleeve extending from a coupling member along said tension member to a position beyond the coupling member, said sleeve comprising a helically coiled element closely encompassing said tension member.

19. A track section for a flexible self-laying vehicle track having a plurality of track sections, said section comprising stiff metallic coupling members at the ends of the section, said sections having sockets, bushings seated in said sockets, a flexible metal cable having its ends secured in said bushings at each coupling member, and a flexible tubular sleeve surrounding a portion of said cable with one end thereof secured at a bushing.

CHARLES W. LEGUILLON.